Feb. 14, 1961 J. R. DAVEY 2,972,017

HUB TELEGRAPH CIRCUIT

Filed Aug. 10, 1959 2 Sheets-Sheet 1

INVENTOR
J.R. DAVEY
BY
John E Cassidy
ATTORNEY

Feb. 14, 1961 J. R. DAVEY 2,972,017

HUB TELEGRAPH CIRCUIT

Filed Aug. 10, 1959 2 Sheets-Sheet 2

INVENTOR
J. R. DAVEY
BY
John E. Cassidy
ATTORNEY

United States Patent Office 2,972,017

Patented Feb. 14, 1961

2,972,017

HUB TELEGRAPH CIRCUIT

James R. Davey, Franklin Township, Somerset County, N.J., assignor to Bell Telephone Laboratories, Incorporated, New York, N.Y., a corporation of New York Filed Aug. 10, 1959, Ser. No. 832,836

10 Claims. (Cl. 178—73)

This invention relates to an improved hub telegraph repeater affording a number of important advantages not heretofore available in hub-type repeaters. One of these advantages is that the present hub circuit permits a number of voice frequency carrier telegraph terminating circuits, such as that disclosed in Patent 2,667,536 granted to L. A. Gardner et al. January 26, 1954, the disclosure of which is hereby incorporated herein, to be connected together on a hub-type basis without requiring special facilities heretofore required when connected into a hub circuit, in an electronic telegraph service board well known in the art. As a result of this the carrier telegraph terminating circuit may be employed to connect directly to a neutral telegraph loop circuit or to the present network without special facilities.

Another advantage of the present hub circuit is that when a loop repeater is connected into the network, no leg coupling unit is required to control the direction of transmission of the signal elements impressed on the hub, to prevent their retransmission back to their point of origin and to control a double space bypass feature.

As a result of the two advantages mentioned in the foregoing, a simple hub arrangement, particularly suited for small offices, becomes available. In these small offices, the well-known more complex telegraph service board, with its special cord circuits, required for testing, monitoring and communicating over the hub cannot be justified economically.

As will become apparent hereinafter the present arrangement employs an individual sending hub for the sending leg of each branch circuit connected into the hub. This has a disadvantage in that it prevents regeneration of signals between the single receiving hub and the single sending hub, characteristic of most half-duplex hub circuits, by means of a single regenerator. As a practical matter, it also limits the number of branches which may be connected into a hub. However, for many small installations, particularly where regeneration is not required, the advantages are controlling.

The present hub telegraph repeater employs passive elements, specifically diodes and resistors for interconnecting the various telegraph facilities into the hub group. No electromagnetic relay or space discharge device forms part of the hub network per se. Attention is called to the fact that a distinction should be made between the telegraph repeater circuits connected into the hub network and the hub network per se. The telegraph repeaters may take any of a number of forms employing electromagnetic relays, space discharge devices and other components. These are employed to repeat the signals transmitted toward the hub network and to repeat the signals transmitted from the hub network. Contrasted with this the hub network per se performs the function of directing the receiving signals toward the desired branches. It is pointed out that in the present arrangement the components which perform the directing functions are the passive elements mentioned in the foregoing, namely, the resistors and the diodes. In the present arrangement, certain of the repeaters used to illustrate the invention include space discharge devices and others include electromagnetic relays.

An object of the invention is the improvement of telegraph hub circuits.

A feature of the invention is the use of passive elements to perform the transmission directing function in a hub network.

Originally, electromagnetic relays were employed in hub circuits. Later, improved hub circuits employing space discharge devices for performing the transmission directing function were invented and have been widely applied. One of the advantages in the employment of space discharge devices in hub circuits is that the number of branches which may be effectively connected to a single hub is thereby increased. There is one important disadvantage in the use of hub circuits employing space discharge devices. This disadvantage is that when these circuits are grouped together so as to take advantage of the relatively small space which they require, a heating problem is introduced because of the heat generated, particularly in the filament circuits of the space discharge devices employed.

In the present arrangement because of the dry rectifier diodes and resistor elements employed to perform the transmission directing function, the heating problem encountered in hub circuits employing space discharge devices is largely eliminated.

A feature of the invention is the minimizing of the heating problem encountered in hub-type repeaters through the employment of passive elements to perform the transmission directing function.

In the present arrangement an individual sending hub is provided for each sending leg of each branch facility connected into the hub.

A feature of the invention, therefore, is a hub circuit having an individual sending hub for each branch. This sending hub is connected to the receiving legs of all branches other than the receiving leg in its own individual branch.

The present invention is a single hub network which may be operated both half duplex and full duplex. When operated half duplex the signals received through the receiving leg of any branch are impressed on the sending legs of all other branches through the individual sending hub associated with the sending leg in each other branch. The receiving leg in any branch is not connected to the sending leg in the same branch. Therefore, no voltage change is produced on the sending leg of a branch in response to signals incoming from the receiving leg of the same branch. When two branches, and two branches only, transmit simultaneously toward the hub the signals transmitted toward the hub network through the receiving leg of Branch 1 for instances, appear on the sending leg of Branch 2 without any interference from the signals transmitted toward the hub network through the receiving leg in Branch 2. The voltage changes produced by the receiving leg in Branch 2 as it transmits toward the hub are impressed on the sending leg of Branch 1 without any interference from the signals which, it is assumed, are being transmitted at the moment through the receiving leg of Branch 1. This permits simultaneous transmission effectively between any two branches connected to the hub. It is pointed out that, although the signals produced simultaneously in the receiving leg of any one of two branches will pass without interference to the other of the two branches, when signals are incoming simultaneously through any two receiving branches, interference will be produced in all branches, except the two which are transmitting toward the hub simultaneously. This would serve as an indication at all other stations connected to the hub that two stations are intercommunicating. If at such a time a third facility wanted to obtain control of the network, it would transmit signals toward the hub. As a result of this, for reasons which should be understood from the foregoing, garbled signals will be produced on the sending leg of each branch. This would serve as a break signal in response to which transmission toward the hub from statoins which are transmitting would be suspended.

A feature of the invention therefore is a hub network arranged for half duplex and full duplex operation which includes a break feature.

This invention may be understood from reference to the associated drawings and the following description which, taken together, disclose a preferred embodiment in which the invention is presently incorporated. It is to be understood, however, that the invention may be incorporated in other embodiments which may be suggested by the present disclosure.

The circuit of Fig. 1 will first be described generally as an aid in understanding the detailed description to follow.

Figure 1:
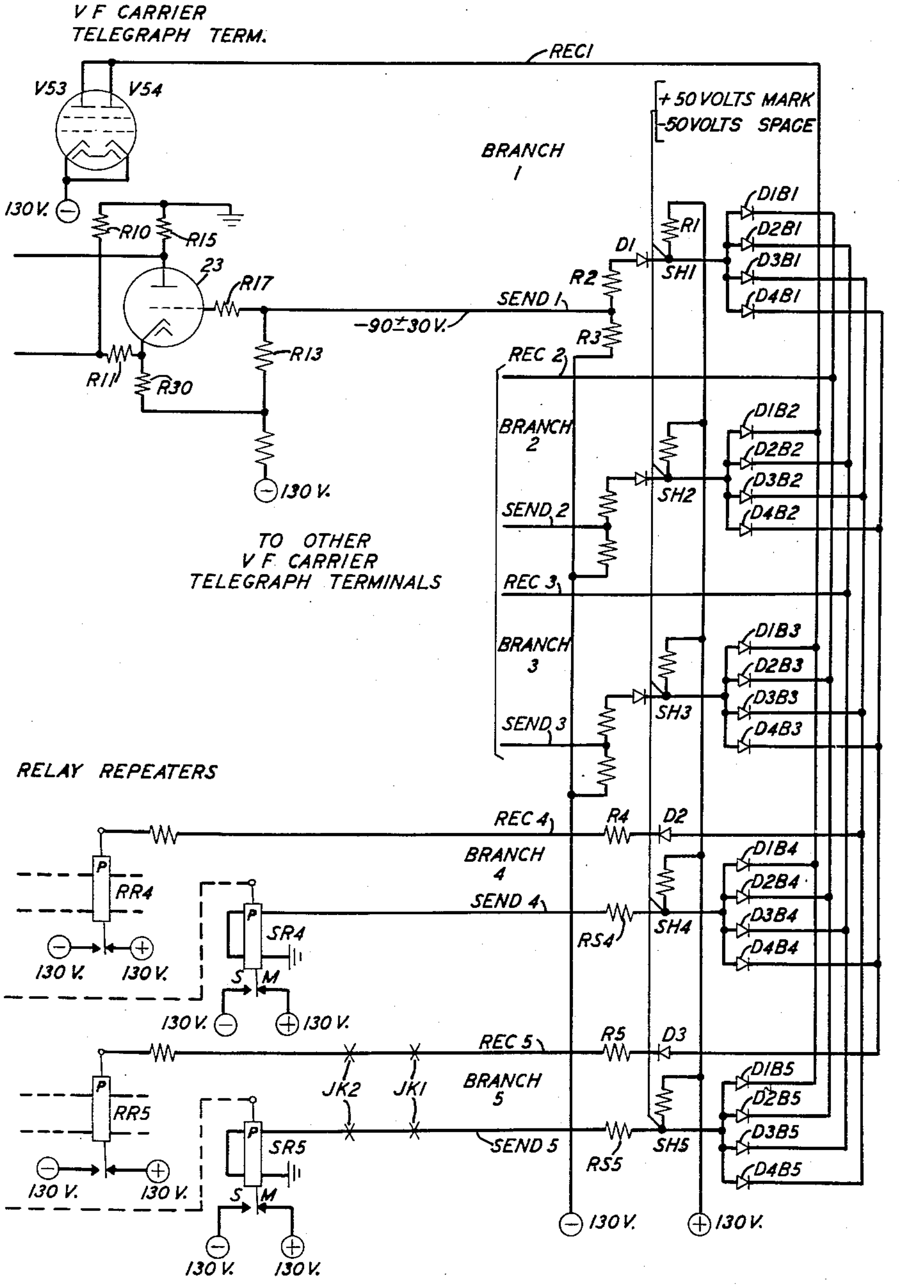
Fig. 1 shows the hub circuit of the present invention.

Fig. 1 shows an arrangement whereby five telegraph branch circuits may be interconnected in a single network in such manner that any one of the telegraph branches may transmit simultaneously to all of the others. When so transmitting, the circuits are arranged so that signals incoming through the receiving leg of any one telegraph branch will not be retransmitted back to their point of origin through the sending leg of the same branch. Fig. 1 also includes an arrangement whereby two stations may transmit effectively simultaneously, each to the other, when the messages are not required to be sent to stations other than the two which are simultaneously sending. Fig. 1 also includes an arrangement whereby when two stations are effectively transmitting, simultaneously garbled signals will be transmitted to the other stations connected into the hub network. Fig. 1 also includes an arrangement whereby if more than two brancshes attempt to transmit simultaneously, garbled signals will thereby be produced and transmitted to all of the stations connected to the network including the stations which are simultaneously sending. This serves as a break signal. A regular break, a long space, can of course be transmitted to any transmitting branch and can thus immediately interrupt the sender.

The network of Fig. 1 is illustrated as consisting of five branches. It is particularly pointed out that the invention is not limited to the interconnection of five branches only through a hub. Three branches or up to five or more branches, may be so connected by the employment of components, the magnitudes of the constants of which are properly selected for the purpose. In the network of Fig. 1, the five branches are indicated as Branch 1, Branch 2, Branch 3, Branch 4 and Branch 5. Each of the branches comprises an individual receiving leg REC—by means of which the signals are received by the branch circuit and directed toward the hub network and an individual sending leg SEND—by means of which signals originating in other branch circuits connected to the hub network are transmitted from the network through the sending leg of any branch.

In one preferred embodiment of invention, such as is shown in Fig. 1, it is assumed that up to three voice frequency carrier telegraph terminating circuits and up to two relay repeater telegraph circuits may form the five branches of a five-branch hub network. Only one of the voice frequency telegraph circuits is shown, and that one only partially, in Fig. 1. This is the circuit shown in the upper left portion of Fig. 1 which is connected through the receiving branch REC 1 and the sending branch SEND 1 to the hub network. Another such voice frequency carrier telegraph terminating circuit is assumed to be connected through Branch 2 and a third is assumed to be connected through Branch 3 into the hub network. Two magnetic relay type repeaters are individually connected through Branch 4 and Branch 5 into the network. Each of these relay repeaters comprises a receiving relay and a sending relay. The receiving relay is in each instance connected through the receiving leg of the associated branch and the sending relay in each instance is connected through the sending leg of the associated branch into the hub network. Thus, receiving relay RR4 in Branch 4 is connected through receiving leg REC 4 and sending relay SR4 in Branch 4 is connected through the sending leg SEND 4 in Branch 4, and receiving relay RR5 in Branch 5 is connected through receiving leg REC 5 and sending relay SR5 in Branch 5 is connected through sending leg SEND 5 into the network.

The voice frequency carrier telegraph circuit shown in part and connected through Branch 1 into the network and other voice frequency carrier telegraph circuits assumed to be connected into the network through Branch 2 and Branch 3 are disclosed in detail in Patent 2,667,536, further identified in the foregoing. The double tetrode designated V53 and V54 in Fig. 1 corresponds to tetrodes V53 and V54 shown in Fig. 3 in Patent 2,667,536. Triode 23 shown in the present Fig. 1 corresponds to triode 23 shown in Fig. 2 of Patent 2,667,536. Each of Branches 2 and 3 in the present Fig. 1 will be similarly equipped.

Any signal incoming to the hub network from the voice frequency carrier terminal circuit connected through Branch 1 will pass through tetrodes V53 and V54, arranged in parallel, through receiving leg REC 1 of Branch 1 into the hub network. It will be observed that receiving leg REC 1 is not directly connected to sending leg SEND 1 associated with Branch 1, so signals incoming through receiving leg REC 1 cannot be transmitted back through the sending leg SEND 1 associated with the same branch. Receiving leg REC 1 is, however, connected directly through an individual dry rectifier to an individual sending hub for each branch circuit which connects directly to the sending legs of each of the other four branches. Thus, receiving leg REC 1 is connected through dry rectifiers D1B2, D1B3, D1B4 and D1B5 to individual sending hubs SH2, SH3, SH4 and SH5, respectively, individual to Branches 2, 3, 4 and 5, respectively. Similarly, receiving leg REC 2 of Branch 2 is connected through the dry rectifiers D1B1, D2B3, D2B4 and D2B5 to individual sending hubs SH1, SH3, SH4 and SH5, individual to Branch 1, Branch 3, Branch 4 and Branch 5, respectively. Signals incoming through receiving leg REC 3, will pass through dry rectifiers, D2B1, D2B2, D3B4 and D3B5 to individual sending hubs SH1, SH2, SH4 and SH5, respectively, individual to Branches 1, 2, 4 and 5, respectively. Receiving leg REC 4 is connected through resistor R4 and dry rectifier D2 into the hub network where it is extended through dry rectifiers D3B1, D3B2, D3B3 and D4B5, respectively, to individual sending hubs SH1, SH2, SH3 and SH5, respectively, individual to Branch 1, Branch 2, Branch 3 and Branch 5. Receiving leg REC 5 is connected through resistor R5 and dry rectifier D3 into the hub network where it is extended through dry rectifiers D4B1, D4B2, D4B3 and D4B4, respectively, to individual sending hubs SH1, SH2, SH3 and SH4, respectively, individual to Branch 1, Branch 2, Branch 3 and Branch 4, respectively. Thus, it will be seen that signals incoming on the receiving leg of any branch will be impressed on the individual sending hub of each of the other branches. It is emphasized that each sending leg has an individual sending hub which connects individually through four dry rectifiers or diodes to the receiving leg of each of the other four branches. From sending hub SH1 in Branch 1 the signals incoming from any of the other branches are transmitted through dry rectifier D1 and resistor R2 to sending leg SEND 1, and are impressed through resistor R17 on the grid of sending triode 23 which controls the transmission of signals to the distant terminal connected to Branch 1. Similarly, signals impressed on sending hub SH2 associated with Branch 2 and sending hub SH3 associated with Branch 3 are transmitted to the distant terminals associated with Branch 2 and Branch 3, respectively. Signals impressed on sending hub SH4 from the receiving leg associated with any of the other four branches pass through resistor RS4, sending leg SEND 4 and through the windings of sending relay SR4 in Branch 4 to ground operating relay SR4. The signals are transmitted from relay SR4 to the distant terminal connected to Branch 4. Signals impressed on sending hub SH5 from any of the sending legs associated with the other four branches pass through resistor RS5, sending leg SEND 5 and through the windings of sending relay SR5 in Branch 5 from which point they are propagated to the distant terminal associated with Branch 5.

The operation of the circuit of Fig. 1 will now be described in detail.

In the following description where the magnitudes of constants are specified, it is to be understood that the magnitudes specified are by way of example as an aid in understanding the invention and they are not to be considered as limitations.

In describing Fig. 1, it has been assumed that there are five branches connected into the hub. The number of branches which may be connected is not so limited. In certain instances there may be as few as two branches and as many as five, and, by using more sensitive relays and other tubes more branches may be connected to the hub. The magnitudes of the constants which are cited in the following are those which apply when the network consists of five branches and the relays and space discharge devices employed are those commonly employed in a well-known voice frequency carrier telegraph terminating circuit and in a well-known relay type repeater. Obviously, the magnitudes will change as the number of branches and the components of the branches are changed. It is particularly pointed out that fewer than five branches may be employed.

Each receiving leg REC 1 through REC 5 operates on an inverse neutral basis. By this is meant that current flows through the receiving leg for the spacing condition and no current flows through the receiving leg for the marking condition. The term "inverse neutral" connotes that transmission is the inverse of neutral transmission in which current is transmitted for the marking condition and no current is transmitted for the spacing condition. With all receiving legs in the marking condition, it will be assumed that each sending hub, SH1 through SH5 is normally at positive 50 volts. It will be assumed also that the voice frequency carrier telegraph terminals are arranged for positive and negative 130-volt, 62.5 milliampere operation. When the voice frequency carrier telegraph terminal circuits shown in Fig. 1 are used in other circuit arrangements to connect to a subscriber loop circuit or to a teletypewriter trunk circuit, for instance, instead of into a hub network as in Fig. 1, the voice frequency carrier telegraph terminal circuits are arranged so that they operate on a neutral basis rather than on an inverse neutral basis. That is to say, the receiving legs conduct for the marking condition and do not conduct for the spacing condition. In order to operate into the present hub terminating circuit, which operates, as has been explained, on an inverse neutral basis, it is necessary to change the voice frequency carrier terminating circuits so that they conduct for the spacing condition and do not conduct for the marking condition. Provision is made in the voice frequency carrier terminating circuit so that this change to inverse neutral operation may be effected. It is performed by changing the polarity of the signals impressed on tetrodes V53 and V54 by actuating switch 61 as shown in Fig. 5 or Fig. 6 of Patent 2,770,670 to its alternate position.

In a five-branch hub system, such as is shown in Fig. 1, when an incoming space signal is received from any one of the three voice frequency carrier telegraph terminals, a current which may be 62.5 milliamperes, for instance, flows in its receiving leg, such as REC 1. This current is drawn through the dry rectifiers or diodes connecting to the send hubs SH2, SH3, SH4 and SH5 of the other four branches. For this assumed condition, the current may divide such that 10 milliamperes is drawn from each of the other two voice frequency carrier telegraph terminal circuit send hubs, and 21 milliamperes is drawn from each of the two relay repeater send hubs. The combined resistance of these four branches may be designed so that the resulting spacing voltage on each sending hub is negative 50 volts, for instance. This affords an 80-volt plate-to-cathode potential during spacing, for instance, of the tetrodes, such as V53 and V54, in any of the voice frequency carrier telegraph terminating circuits which is directing signals into the network.

In the case of the relay type repeaters, inverse neutral operation of the receiving leg is obtained by use of a series diode, such as diodes D2 or D3, to permit current flow only for the spacing condition. For the marking condition, the armatures of relays RR4 and RR5 each engage their right-hand contacts, as shown in Fig. 1, and a potential, which, it is assumed, is positive 130 volts, appears on the receiving leg of Branch 4 and Branch 5. The series diodes D2 and D3 are back biased. For the spacing condition the armatures of these relays are actuated to engage their left-hand contacts and a potential which, it is assumed, is negative 130 volts appears on the receiving leg. The diodes D2 or D3 conduct. For the assumed conditions, the series resistor, such as resistor R4 or resistor R5, in the receiving leg of each of the relay repeaters, limits the spacing current which may pass through either one of the receiving legs when conducting to 51 milliamperes, for instance. This 51-milliampere current may be divided so that 10 milliamperes is drawn from each of the three voice frequency carrier telegraph terminating circuits and 21 milliamperes is drawn from the sending hub of the other relay type repeater, for instance.

The assumed positive or negative 50-volt signal on the sending hub of any voice frequency carrier telegraph terminal circuit is coupled to its respective sending leg by a voltage divider string consisting of resistors, such as resistors R2 and R3, and a diode, such as D1, as designated in Branch 1. Diode D1 may, for instance, be a Zenner diode which is well known in the art. With the circuit thus arranged, the signal which is impressed on the sending leg, of any voice frequency carrier terminating circuit such as sending leg SEND 1 in Branch 1, is centered on a potential of negative 90 volts and swings positive 30 volts or negative 30 volts from this centering potential for the marking and spacing condition, respectively. The potential of negative 90 volts is the same as the cathode potential of the modulator drive tube 23 which controls the transmission of signals in the sending branch of the voice frequency carrier telegraph terminating circuit disclosed in the Patent 2,770,670. Thus, the present hub circuit is compatible in operation with the voice frequency carrier telegraph terminating circuit of Patent 2,667,536 as that circuit is otherwise employed. A constant voltage drop of about 60 volts, for instance, is maintained across the diode such as diode D1. This reduces the coupling loss and obviates the need for a biasing supply more negative than 130 volts.

The positive and negative 50-volt signal at the send hubs, such as SH4 or SH5 of the relay type repeater branches, results in a polar current which may be, for instance, positive and negatice 6.5 milliamperes through the windings of the sending relay SR4 and SR5 in each of the relay repeaters to ground. Thus, the magnetic relay repeaters, when connected into the present hub, operate under the same conditions as for their usual operation on other circuits. When no sending relay is connected, it is necessary to provide a substitute impedance to ground, to prevent upsetting the negative 50-volt spacing voltage on the sending hubs.

The four diodes connected as a group to each sending hub constitute a well-known OR gate configuration. A spacing signal on any receiving leg can thus pass to all sending hubs, except its own. It will be observed that the polling of the diodes is such that the spacing signal is prevented from reaching its own sending hub through the indirect paths by way of the other sending hubs. In spite of the fact that there are 12 such indirect paths, in the present embodiment, the use of the diodes specified, which are silicon diodes, keeps the reverse current low enough to effectively isolate the sending hub from the receiving leg of the same branch circuit and the sending leg remains marking.

If, while a spacing signal is incoming over a first receiving hub, a second receiving hub also receives a spacing signal, all sending hubs become spacing. This is so because a signal incoming from any leg is passed to the sending hub of each of the other branches. When spaces are received from two receiving legs, therefore, signals must be passed to all sending hubs. Attention is called to the fact that each sending hub associated with either of two branches which are simultaneously sending, will receive signals only from the other branch which is simultaneously sending, and these signals will not be garbled. This affords a desirable full duplex feature in a hub circuit having more than two branches.

If more than two stations transmit simultaneously all signals will be garbled. Thus, this network provides another desirable feature, corresponding to the double space by-pass feature incorporated in certain other improved hub circuit arrangements. It also permits two branches to transmit effectively one to another on full duplex basis.

Figure 2:
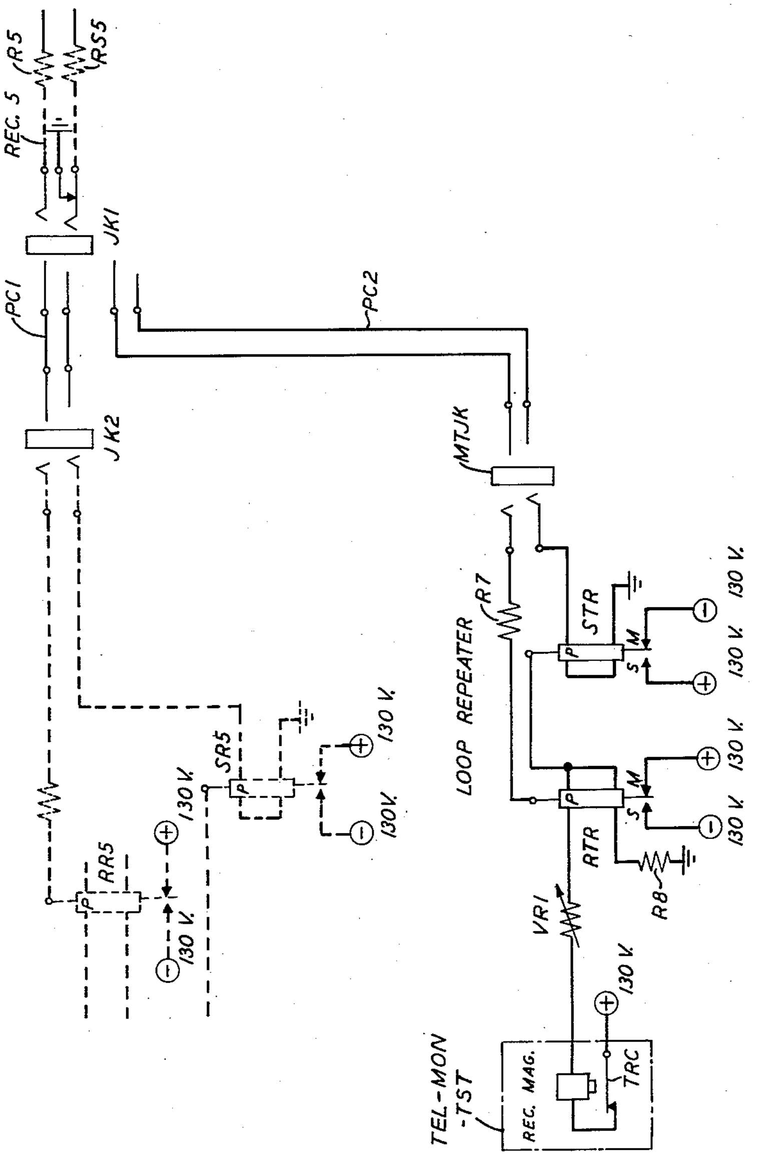
Fig. 2 shows circuits which may be connected to Fig. 1 for monitoring, testing and communicating.

Another desirable feature of this network is that no special monitoring or communicating cord circuits need be provided. It is to be understood that in order to administer hub circuit concentrations at service boards, special facilities are provided for communication and testing purposes. These facilities include communication cords and testing cords, well known in the art, such as are shown, for instance, in Patent 2,542,208 granted to M. R. Purvis, February 20, 1951. As may be observed from reference to that patent, the communication and testing facilities require a considerable amount of equipment and are necessarily expensive. By contrast the hub circuit of Fig. 1 may be monitored and communication may be performed through the hub circuit by means of a relatively simple loop repeater of the same type used to connect to working subscriber loops, such as is shown in Fig. 2. The circuit of Fig. 2 may be connected to any one of the relay repeaters by means of the cord and plug shown in Fig. 2 which may be patched to the jacks indicated in the relay repeater of Branch 5. When it is desired to split off one branch for testing, the branch which is split off can be patched to another hub network, such as that shown in Fig. 1, which is not momentarily being used, and the simple loop repeater, such as shown in Fig. 2 may be employed for communication and testing. Normal 60-milliampere neutral signals appear on the loop side of the repeater circuit shown in Fig. 2. This permits the connection of a monitoring teletypewriter or a source of test signals or a transmission measuring set to the loop side of the repeater of Fig. 2.

Refer now to Fig. 2. Jacks JK1 and JK2 are inserted in any relay repeater branch, such as in Branch 5, in positions indicated in Fig. 1. The sending leg SEND 5 of Branch 5 of Fig. 1 and the receiving leg REC 5 of Branch 5 connect to the ring and tip circuits of jack JK1, respectively. The sending leg is terminated in ground through contacts of the jack. The relay repeater of Branch 5 is terminated in jack JK2. As thus arranged the relay repeater would normally be connected to the hub network by a double plug-ended patch cord such as cord PC1. When so connected the ground termination of relay RS5 is disconnected and the sending leg is grounded through the winding of relay SR5. The operation of the magnetic repeater and of the hub concentration group is obviously the same as heretofore described. As arranged in Fig. 2, the magnetic repeater may be connected to any hub group as desired.

The circuit of Fig. 2 shows a second double plug-ended patching cord PC2. When it is desired to monitor on the hub circuit of Fig. 1, patching cord PC2 may be patched between jack JK1 and the monitoring or test jack MTJK. The receiving leg of Branch 5 is then connected through the tip of jack JK1 and the tip of the patching cord to the tip of the monitoring and testing jack MTJK, from which it extends through resistor R7 to positive battery through the armature and marking contact of the loop repeater receiving relay RTR. The sending leg of Branch 5 is extended through the ring of jack JK1, ring circuit of the patching cord, ring of monitoring and testing jack MTJK and the winding of the sending relay STR in the loop repeater to ground. It will be observed that the receiving leg and the sending leg are thus terminated in the same manner as when Branch 5 is connected to the magnetic repeater in Fig. 1. The left-hand or loop side of the loop repeater connects to a teletypewriter, or monitoring printer, or test equipment indicated by the rectangle TEL—MON—TST. Assuming that a teletypewriter is connected, a circuit may be traced from positive battery which may be 130 volts for instance, through the transmitting contacts TRC of the teletypewriter, the winding of the receiving magnet REC—MAG, variable resistor VR1, top winding of relay RTR and the armature of relay STR to negative battery. From the apex of relay RTR a biasing circuit extends through its bottom winding and resistor R8 to ground. With battery of opposite polarity connected to the extremities of the loop circuit the armature of relay RTR is actuated to engage with its marking contact M. The current through the bottom winding of relay RTR tends to actuate its armature to engage with its spacing contact, but it is ineffective for the marking condition. For the spacing condition the transmitting contacts TRC of the teletypewriter transmitter are open. The effect of the biasing current in the bottom winding of relay RTR actuates its armature to engage with its spacing contact S, connecting negative battery to the receiving leg REC 5 of Branch 5. It will thus be observed that the conditions applied to the receiving branch REC 5 are the same as described for regular operation. For spacing signals transmitted from the hub network the armature of relay STR is operated to engage with its spacing contacts. This connects positive battery to each end of the loop circuit. No current flows through the top winding of relay RTR for this condition. Since the polarity of the current through the bottom winding of relay RTR has been reversed, the effect of the current therein maintains its armature in engagement with its marking contact M. No current flows through the receiving magnet REC—MAG of the teletypewriter. A spacing signal is therefore registered therein.

It is pointed out that whereas the operation of the cricuit in Fig. 2 has been described for the condition whereunder a teletypewriter is connected to the loop repeater, a monitoring device, such as a receiving only teletypewriter or a source of test signals may be substituted for the teletypewriter and the operation of the circuit should be obvious from the foregoing.

It should be apparent, therefore, that communicating through the hub network, monitoring on the hub network, or supplying test signals to the hub network is a simple operation requiring a minimum of equipment by comparison with the operation and equipment required to perform these functions on hub circuits of the kind heretofore known in the art.

What is claimed is:

1. A telegraph hub circuit, said hub circuit having two or more branch circuits interconnected to form a hub, means in said hub circuit whereby any one of said branch circuits can transmit to all of the other branch circuits simultaneously, each of said branch circuits having an individual receiving leg for transmitting signals incoming toward said hub circuit toward all of the other branch circuits connected to the hub and an individual sending leg for transmitting signals received by said hub circuit from all of the other branches, each of said receiving legs having an individual connection to the sending leg of each of the branches other than the sending leg in its own branch, and an individual diode in each of said sending legs in each said connection.

2. A telegraph hub circuit having more than two branch circuits, each of said branch circuits having an individual receiving leg and an individual sending leg, means in said hub circuit whereby any branch circuit can transmit to all of the others simultaneously, said means comprising an individual sending hub in said hub circuit for each of said sending legs connected individually to each sending leg, an individual connection from each receiving leg to the sending hub individual to each sending leg other than the sending leg in its own branch, and an individual diode in each said individual connection.

3. A hub telegraph circuit having more than two telegraph communication circuits interconnected to a hub circuit group, each of said circuits comprising an individual receiving leg and an individual sending leg, means in said hub circuit group, responsive to telegraph signals incoming to said group from any one of said communication circuits, for transmitting said signal as received to all of the other of said communication circuits, simultaneously, said means comprising an individual sending hub for each said sending leg connected individually to every receiving leg except the receiving leg in its respective communication circuit, said means in said hub circuit group responsive to telegraph signals incoming from a first and a second of said communication circuits, respectively, simultaneously, for transmitting said communication signals, from said first and said second circuit, as received without modulation, to said second and said first communication circuit, respectively.

4. A hub telegraph circuit in accordance with claim 3 having means therein for transmitting a break signal.

5. A hub telegraph circuit in accordance with claim 3 including means responsive to signals incoming to said hub group from a third one of said communication circuits while said first and said second communication circuits are transmitting simultaneous toward said hub group for transmitting garbled communication signals to all of said communication circuits as an indication that more than two of said communication circuits are transmitting simultaneously toward said hub group.

6. A hub telegraph group comprising more than two telegraph communication branches, a receiving leg and a sending leg in each of said branches, first means in said group responsive to signals incoming to said group from any one of said branches for transmitting said signals to all of the other of said branches, simultaneously, second means in said group responsive to said reception for preventing the transmission of said signals back through the branch from which said signals are incoming to said hub group, said second means comprising an individual sending hub connected in the sending leg of each of said branches, an individual connection from each of said sending hubs in each of said branches to each receiving leg in all branches other than the receiving leg in its individual branch and an individual diode in each said individual connection.

7. A hub telegraph group in accordance with claim 6 including means for effectively transmitting simultaneously from one to another of any two of said branches.

8. A hub telegraph group in accordance with claim 7 including means, responsive to said simultaneous transmission from one to another of any two of said branches, for transmitting garbled signals to all of the remainder of said branches, other than said two, connected to said hub group.

9. A hub telegraph group in accordance with claim 6 having means responsive to simultaneous transmission from more than two branches connected to said hub for transmitting garbled signals over all of said branches connected to said hub group.

10. A telegraph hub circuit group having a first, a second and a third telegraph signal communicating branch circuit, a first receiving leg and a first sending leg, a second receiving leg and a second sending leg, a third receiving leg and a third sending leg in said first, second and third branch circuits, respectively, each of said receiving legs having means connected thereto for transmitting telegraph signals toward said hub group, each of said sending legs having means connected thereto for transmitting signals from said hub group, a first, a second and a third sending hub individual to and connected to said first, second and third sending leg, respectively, a first and a second diode, connected directly to said first sending hub, a third and a fourth diode connected directly to said second sending hub, a fifth and a sixth diode connected directly to said third sending hub, a direct connection from said first receiving leg to said third and said fifth diode, a direct connection from said second receiving leg to said first and said sixth diode, a direct connection from said third receiving leg to said second and said fourth diode and a common source of potential connected through individual resistors to said first, second and third sending hub.

References Cited in the file of this patent

UNITED STATES PATENTS 2,608,619 Davey ---------------- Aug. 26, 1952